(12) United States Patent
Reed et al.

(10) Patent No.: US 10,358,701 B2
(45) Date of Patent: Jul. 23, 2019

(54) NICKEL-BASED ALLOY

(71) Applicant: Oxford University Innovation Limited, Oxford (GB)

(72) Inventors: Roger Reed, Oxford (GB); Zailing Zhu, Oxford (GB); David Crudden, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 27 days.

(21) Appl. No.: 15/563,062

(22) PCT Filed: Mar. 23, 2016

(86) PCT No.: PCT/GB2016/050811
§ 371 (c)(1),
(2) Date: Sep. 29, 2017

(87) PCT Pub. No.: WO2016/156806
PCT Pub. Date: Oct. 6, 2016

(65) Prior Publication Data
US 2018/0066340 A1    Mar. 8, 2018

(30) Foreign Application Priority Data
Apr. 1, 2015    (GB) .................................. 1505653.4

(51) Int. Cl.
*C22C 19/05*    (2006.01)
*C22F 1/10*    (2006.01)
*F01D 5/28*    (2006.01)

(52) U.S. Cl.
CPC .......... *C22C 19/057* (2013.01); *C22C 19/056* (2013.01); *C22F 1/10* (2013.01); *F01D 5/28* (2013.01); *F05D 2300/175* (2013.01); *Y02T 50/671* (2013.01)

(58) Field of Classification Search
CPC ........ C22C 19/056; C22C 19/057; C22F 1/10
See application file for complete search history.

(56) References Cited

U.S. PATENT DOCUMENTS

| 4,719,080 A | 1/1988 | Duhl et al. |
| 5,035,958 A | 6/1991 | Jackson et al. |
| 5,540,790 A | 7/1996 | Erickson |
| 5,916,382 A | 6/1999 | Sato et al. |
| 6,074,602 A | 6/2000 | Wukusick et al. |
| 2002/0041821 A1 | 4/2002 | Manning et al. |
| 2006/0054251 A1 | 3/2006 | Yokokawa et al. |
| 2011/0256018 A1 | 10/2011 | Choi et al. |

FOREIGN PATENT DOCUMENTS

| CN | 101680059 | 3/2010 |
| CN | 102031419 | 4/2011 |
| CN | 103436739 | 12/2013 |
| EP | 0789087 | 8/1997 |
| EP | 1382697 | 1/2004 |
| EP | 1642989 | 4/2006 |
| EP | 2045345 | 4/2009 |
| EP | 2562277 | 2/2013 |
| EP | 2805784 | 11/2014 |
| GB | 2241358 | 8/1991 |
| JP | H09-259156 | 10/1997 |
| JP | 2009114501 | 5/2009 |
| JP | 2011-174123 | 9/2011 |
| WO | WO 02/070764 | 9/2002 |
| WO | WO 2014/070356 | 5/2014 |

OTHER PUBLICATIONS

Curtarolo et al., "The high-throughput highway to computational materials design," *Nature Materials*, 2013; 12: 191-201.
International Preliminary Report on Patentability issued in Application No. PCT/GB2016/050811, dated Oct. 3, 2017.
International Search Report and Written Opinion issued in Application No. PCT/GB2016/050811, dated Jun. 6, 2016.
Reed et al., "Alloys-by-Design: Application to nickel-based single crystal superalloys," *Acta Materialia*, 2009; 57: 5898-5913.
Reith et al., "Towards an ab initio modelling of phase diagrams: cluster expansion and vibrational free energies,".
Office Action issued in Corresponding Chinese Patent Application No. 201680026651, dated Feb. 26, 2019. (English Translation).

*Primary Examiner* — Jessee R Roe
(74) *Attorney, Agent, or Firm* — Norton Rose Fulbright US LLP

(57) ABSTRACT

A nickel-based alloy composition consisting, in weight percent, of: between 7.0 and 1.0% chromium, between 4.0 and 14.0% cobalt, between 1.0 and 2.0% rhenium, between 0.5 and 11.0% tungsten, between 0.0 and 0.5% molybdenum, between 4.0 and 6.5% aluminum, between 8.0 and 12.0 tantalum, between 0.0 and up to 0.5% hafnium, between 0.0 and 0.5% niobium, between 0.0 and 0.5% titanium, between 0.0 and 0.5% vanadium, between 0.0 and 0.1% silicon, between 0.0 and 0.1% yttrium, between 0.0 and 0.1% lanthanum, between 0.0 and 0.1% cerium, between 0.0 and 0.003% sulphur, between 0.0 and 0.05% manganese, between 0.0 and 0.05% zirconium, between 0.0 and 0.005% boron, between 0.0 and 0.01% carbon, the balance being nickel and incidental impurities.

20 Claims, 12 Drawing Sheets

NICKEL-BASED ALLOY

CROSS-REFERENCED TO RELATED APPLICATION

This application is a national phase application under 35 U.S.C. § 371 of International Patent Application No. PCT/GB2016/050811 filed Mar. 23, 2016, which claims priority to U.K. Patent Application No. GB1505653.4, filed Apr. 1, 2015. The entire contents of the referenced applications are incorporated herein by reference.

The present invention relates to a nickel-based single crystal superalloy composition for jet propulsion and power generation applications. The material has a low cost relative to equivalent alloy grades and provides the combination of creep resistance and corrosion resistance necessary for gas turbine applications.

Examples of typical compositions of second generation nickel-based single crystal superalloys which are subjected to high temperatures are listed in Table 1. These alloys may be used for the manufacture of rotating/stationary turbine blades used in aircraft and gas turbine engines.

TABLE 1

Nominal composition in wt. % of commercially used second generation single crystal turbine blade alloys.

| Alloy | Cr | Co | Mo | Re | W | Al | Ti | Ta | Hf |
|---|---|---|---|---|---|---|---|---|---|
| CMSX-4 | 6.5 | 9.0 | 0.6 | 3.0 | 6.0 | 5.6 | 1.0 | 6.5 | 0.1 |
| PWA1484 | 5.0 | 10.0 | 2.0 | 3.0 | 6.0 | 5.6 | 0.0 | 8.7 | 0.1 |
| ReneN5 | 7.0 | 8.0 | 2.0 | 3.0 | 5.0 | 6.2 | 0.0 | 7.0 | 0.2 |
| TMS-82+ | 4.9 | 7.8 | 1.9 | 2.4 | 8.7 | 5.3 | 0.5 | 6.0 | 0.1 |

These materials are used within the hottest section of a gas turbine engine because of their outstanding resistance to mechanical and chemical degradation. They contain as many as ten different alloying elements, necessary to confer the desired combination of properties.

It is an aim of the invention to provide a nickel-based alloy that has a relatively lower cost than the commercially used second generation single crystal turbine blade alloys listed in Table 1.

It is an aim of the invention is to provide an alloy which has similar or improved high temperature behaviour in comparison to the second generation alloys listed in Table 1.

The present invention provides a nickel-based alloy composition consisting, in weight percent, of: between 7.0 and 11.0% chromium, between 4.0 and 14.0% cobalt, between 1.0 and 2.0% rhenium, between 5.5 and 11.0% tungsten, between 0.0 and 0.5% molybdenum, between 4.0 and 6.5% aluminium, between 8.0 and 12.0% tantalum, between 0.0 and up to 0.5% hafnium, between 0.0 and 0.5% niobium, between 0.0 and 0.5% titanium, between 0.0 and 0.5% vanadium, between 0.0 and 0.1% silicon, between 0.0 and 0.1% yttrium, between 0.0 and 0.1% lanthanum, between 0.0 and 0.1% cerium, between 0.0 and 0.003% sulphur, between 0.0 and 0.05% manganese, between 0.0 and 0.05% zirconium, between 0.0 and 0.005% boron, between 0.0 and 0.01% carbon, the balance being nickel and incidental impurities. This composition provides a good balance between cost, density and creep and oxidation resistance.

In an embodiment, the nickel-based alloy composition consists, in weight percent, of between 7.0 and 8.5% chromium. Such an alloy is particularly resistant to TCP formation whilst still having good oxidation resistance.

In an embodiment, the nickel-based alloy composition consists, in weight percent, of between 4.0 and 12.0%, preferably between 7.0 and 11.0% cobalt, more preferably between 9.0 and 11.0% cobalt, yet more preferably between 9.2 and 14.0, 12.0 or 11.0% cobalt. Such an alloy is increasingly resistant to creep deformation as the minimum amount increases with a limited level of creep anisotropy (orientation dependence) being observed, particularly for lower maximum amounts of cobalt.

In an embodiment, the nickel-based alloy composition consists, in weight percent, of between 1.4 and 1.8% rhenium. This composition has a further improved compromise between cost and resistance to creep.

In an embodiment, the nickel-based alloy composition consists, in weight percent of, between 6.0 and 11.0% tungsten, preferably between 8.0 and 10.5% tungsten, more preferably between 8.0 and 9.5% tungsten. This composition strikes a compromise between low weight and creep resistance.

In an embodiment, the nickel-based alloy composition consists, in weight percent, of between 5.5 and 6.5% aluminium. This composition achieves high creep resistance (through high APB energy) and reduced density and/or increased oxidation resistance.

In an embodiment, the nickel-based alloy composition consists, in weight percent, of between 8.0 and 10.5% tantalum. This provides the best balance between creep resistance and density and/or prevents the possibility of formation of the Eta ($\varepsilon$) phase $Ni_3Ta$. Preferably the alloy consists of between 8.0 and 10.0% tantalum, more preferably between 8.0 and 9.5% tantalum. This reduces the cost of the alloy further as well as the propensity for Eta ($\varepsilon$) phase $Ni_3Ta$ formation.

In an embodiment, the nickel-based alloy composition consists, in weight percent, of between 0.0 and 0.2% hafnium. This is optimum for tying up incidental impurities in the alloy, for example, carbon.

In an embodiment, the nickel-based alloy composition consists, in weight percent, of more than 9.0% cobalt, preferably more than 9.2% cobalt. This composition helps reduce the gamma-prime solvus temperature, increasing the heat-treatment window preventing incipient melting during heat-treatment processes.

In an embodiment, the nickel-based alloy composition consists, in weight percent, of less than 10.0% tungsten, preferably less than 9.8% tungsten. Such an alloy has the best balance between creep resistance and density and/or microstructural stability.

In an embodiment, in the nickel-based alloy composition, the sum of the elements cobalt and tungsten, in weight percent, is greater than 17%. Such an alloy has superior creep resistance.

In an embodiment, in the nickel-based alloy composition, the sum of the elements tungsten and tantalum, in weight percent, is less than 19%. This is advantageous as such an alloy has a comparatively lower density.

In an embodiment, in the nickel-based alloy composition, the sum of the elements aluminium and tantalum, in weight percent, is between 13.5 and 16.5%. This helps achieve the desired volume fraction of $\gamma'$.

In an embodiment, in the nickel-based alloy composition, the sum of the elements rhenium, chromium and tungsten, in weight percent, is less than 19%. This composition is particularly resistant to TCP phase formation.

In an embodiment, in the nickel-based alloy composition, the sum of the elements niobium, titanium and vanadium, in weight percent, is less than 1%. This means that those elements do not have too much of a deleterious effect on environmental resistance of the alloy.

In an embodiment, the sum of the elements molybdenum and tungsten is at least 6 wt. %, preferably at least 8 wt. %. This achieves a good balance between creep resistance and low propensity for TCP phase formation.

In an embodiment, in the nickel-based alloy composition, the sum of the elements niobium, titanium, vanadium and tantalum is between 8.0-10.5 wt. %, preferably 8.0-9.5 wt. %. This results in a preferred volume fraction of γ'.

In an embodiment, the nickel-based alloy composition has between 60 and 70% volume fraction γ'.

In an embodiment, a single crystal article is provided, formed of the nickel-based alloy composition of any of the previous embodiments.

In an embodiment, a turbine blade for a gas turbine engine is provided, formed of an alloy according to any of the previous embodiments.

In an embodiment, a gas turbine engine comprising the turbine blade of the previous embodiment is provided.

The term "consisting of" is used herein to indicate that 100% of the composition is being referred to and the presence of additional components is excluded so that percentages add up to 100%. Unless otherwise stated, all amounts are in weight percent.

The invention will be more fully described, by way of example only, with reference to the accompanying drawings in which.

Traditionally, nickel-based superalloys have been designed through empiricism. Thus their chemical compositions have been isolated using time consuming and expensive experimental development, involving small-scale processing of limited quantities of material and subsequent characterisation of their behaviour. The alloy composition adopted is then the one found to display the best, or most desirable, combination of properties. The large number of possible alloying elements indicates that these alloys are not entirely optimised and that improved alloys are likely to exist.

In superalloys, generally additions of chromium (Cr) and aluminium (Al) are added to impart resistance to oxidation, cobalt (Co) is added to improve resistance to sulphidisation. For creep resistance, molybdenum (Mo), tungsten (W), Co, rhenium (Re) and sometimes ruthenium (Ru) are introduced, because these retard the thermally-activated processes—such as, dislocation climb—which determine the rate of creep deformation. To promote static and cyclic strength, aluminium (Al), tantalum (Ta) and titanium (Ti) are introduced as these promote the formation of the precipitate hardening phase gamma-prime (γ'). This precipitate phase is coherent with the face-centered cubic (FCC) matrix phase which is referred to as gamma (γ).

A modelling-based approach used for the isolation of new grades of nickel-based superalloys is described here, termed the "Alloys-By-Design" (ABD) method. This approach utilises a framework of computational materials models to estimate design relevant properties across a very broad compositional space. In principle, this alloy design tool allows the so called inverse problem to be solved; identifying optimum alloy compositions that best satisfy a specified set of design constraints.

The first step in the design process is the definition of an elemental list along with the associated upper and lower compositional limits. The compositional limits for each of the elemental additions considered in this invention—referred to as the "alloy design space"—are detailed in Table 2.

TABLE 2

| Alloys design space in wt. % searched using the "Alloys-by-Design" method. | | | | | |
|---|---|---|---|---|---|
| | Cr | Co | Re | W | Al | Ta |
| Min | 3.0 | 0.0 | 0.0 | 0.0 | 3.0 | 3.0 |
| Max | 16.0 | 15.0 | 5.0 | 13.0 | 8.0 | 16.0 |

The second step relies upon thermodynamic calculations used to calculate the phase diagram and thermodynamic properties for a specific alloy composition. Often this is referred to as the CALPHAD method (CALculate PHAse Diagram). These calculations are conducted at the service temperature for the new alloy (900° C.), providing information about the phase equilibrium (microstructure).

A third stage involves isolating alloy compositions which have the desired microstructural architecture. In the case of single crystal superalloys which require superior resistance to creep deformation, the creep rupture life is maximised when the volume fraction of the precipitate hardening phase γ' lies between 60%-70%. It is also necessary that the γ/γ' lattice misfit should conform to a small value, either positive or negative, since coherency is otherwise lost; thus limits are placed on its magnitude. The lattice misfit δ is defined as the mismatch between γ and γ' phases, and is determined according to $$\delta = \frac{2(a_{\gamma'} - a_\gamma)}{a_{\gamma'} + a_\gamma} \quad (1)$$

where $\alpha_\gamma$ and $\alpha_{\gamma'}$ are the lattice parameters of the $\gamma$ and $\gamma'$ phases.

Rejection of alloy on the basis of unsuitable microstructural architecture is also made from estimates of susceptibility to topologically close-packed (TCP) phases. The present calculations predict the formation of the deleterious TCP phases sigma ($\sigma$) and mu ($\mu$) using CALPHAD modelling.

Thus the model isolates all compositions in the design space which are calculated to result in a volume fraction of $\gamma'$ of between 60 and 70%, which have a lattice misfit $\gamma'$ of less than a predetermined magnitude and have a total volume fraction of TCP phases below a predetermined magnitude.

In the fourth stage, merit indices are estimated for the remaining isolated alloy compositions in the dataset. Examples of these include: creep-merit index (which describes an alloy's creep resistance based solely on mean composition), anti-phase boundary (APB) energy, density and cost.

In the fifth stage, the calculated merit indices are compared with limits for required behaviour, these design constraints are considered to be the boundary conditions to the problem. All compositions which do not fulfil the boundary conditions are excluded. At this stage, the trial dataset will be reduced in size quite markedly.

The final, sixth stage involves analysing the dataset of remaining compositions. This can be done in various ways. One can sort through the database for alloys which exhibit maximal values of the merit indices—the lightest, the most creep resistant, the most oxidation resistant, and the cheapest for example. Or alternatively, one can use the database to determine the relative trade-offs in performance which arise from different combination of properties.

The example four merit indices are now described.

The first merit index is the creep-merit index. The overarching observation is that time-dependent deformation (i.e. creep) of a single crystal superalloy occurs by dislocation creep with the initial activity being restricted to the $\gamma$ phase. Thus, because the fraction of the $\gamma'$ phase is large, dislocation segments rapidly become pinned at the $\gamma/\gamma'$ interfaces. The rate-controlling step is then the escape of trapped configurations of dislocations from $\gamma/\gamma'$ interfaces, and it is the dependence of this on local chemistry which gives rise to a significant influence of alloy composition on creep properties.

A physically-based microstructure model can be invoked for the rate of accumulation of creep strain $\dot{\varepsilon}$ when loading is uniaxial and along the $\langle 001 \rangle$ crystallographic direction. The equation set is $$\dot{\varepsilon}_{\langle 001 \rangle} = \frac{16}{\sqrt{6}} \rho_m \phi_p D_{eff} (1 - \phi_p)(1/\phi_p^{1/3} - 1)\sinh\left\{\frac{\sigma b^2 \omega}{\sqrt{6} K_{CF} kT}\right\} \quad (2)$$

$$\dot{\rho}_m = C\dot{\varepsilon}_{\langle 001 \rangle} \quad (3)$$

where $\rho_m$ is the mobile dislocation density, $\phi_p$ is the volume fraction of the $\gamma'$ phase, and $\omega$ is width of the matrix channels. The terms $\sigma$ and $T$ are the applied stress and temperature, respectively. The terms $b$ and $k$ are the Burgers vector and Boltzmann constant, respectively. The term $K_{CF}=1+2\phi_p^{1/3}/3\sqrt{3\pi}(1-\phi_p^{1/3})$ is a constraint factor, which accounts for the close proximity of the cuboidal particles in these alloys. Equation 3 describes the dislocation multiplication process which needs an estimate of the multiplication parameter C and the initial dislocation density. The term $D_{eff}$ is the effective diffusivity controlling the climb processes at the particle/matrix interfaces.

Note that in the above, the composition dependence arises from the two terms $\phi_p$ and $D_{eff}$. Thus, provided that the microstructural architecture is assumed constant (microstructural architecture is mostly controlled by heat treatment) so that $\phi_p$ is fixed, any dependence upon chemical composition arises through $D_{eff}$. For the purposes of the alloy design modelling described here, it turns out to be unnecessary to implement a full integration of Equations 2 and 3 for each prototype alloy composition. Instead, a first order merit index $M_{creep}$ is employed which needs to be maximised, which is given by $$M_{creep} = \sum_i x_i / \tilde{D}_i \quad (4)$$

where $x_i$ is the atomic fraction of solute i in the alloy and $\tilde{D}_i$ is the appropriate interdiffusion coefficient.

The second merit index is for anti-phase boundary (APB) energy. Fault energies in the $\gamma'$ phase—for example, the APB energy—have a significant influence on the deformation behaviour of nickel-based superalloys. Increasing the APB energy has been found to improve mechanical properties including, tensile strength and resistance to creep deformation. The APB energy was studied for a number of Ni—Al—X systems using density functional theory. From this work the effect of ternary elements on the APB energy of the $\gamma'$ phase was calculated, linear superposition of the effect for each ternary addition was assumed when considering complex multicomponent systems, resulting in the following equation, $$\gamma_{APB}=195-1.7x_{Cr}-1.7x_{Mo}+4.6x_W+27.1x_{Ta}+21.4x_{Nb}+15x_{Ti} \quad (5)$$

where, $x_{Cr}$, $x_{Mo}$, $x_W$, $x_{Ta}$, $x_{Nb}$ and $x_{Ti}$ represent the concentrations, in atomic percent, of Cr, Mo, W, Ta, Nb and Ti in the $\gamma'$ phase, respectively. The composition of the $\gamma'$ phase is determined from phase equilibrium calculations.

The third merit index is density. The density, $\rho$, was calculated using a simple rule of mixtures and a correctional factor, where, $\rho_i$ is the density for a given element and $x_i$ is the atomic fraction of the alloy element.

$$\rho=1.05[\Sigma_i x_i \rho_i] \quad (6)$$

The fourth merit index was cost. In order to estimate the cost of each alloy a simple rule of mixtures was applied, where the weight fraction of the alloy element, $x_i$, was multiplied by the current (2015) raw material cost for the alloying element, $c_i$.

$$Cost=\Sigma_i x_i c_i \quad (7)$$

The estimates assume that processing costs are identical for all alloys, i.e. that the product yield is not affected by composition.

The ABD method described above was used to isolate the inventive alloy composition. The design intent for this alloy was to lower the alloy cost relative to the commercially used second generation single crystal turbine blade alloys listed in Table 1. This low cost alloy was required to have similar/improved behaviour in comparison to the second generation alloys listed. In particular, focus was placed on having comparable/improved resistance to creep deformation and oxidation damage. Control of other material properties, such as, density, microstructural stability (i.e. remaining substantially free from undesirable TCP phases) and lattice misfit were also considered in the design so that optimal performance was realised.

The material properties—determined using the ABD method—for the commercially used second generation single crystal turbine blade alloys are is listed in Table 3. The design of the new alloy was considered in relation to the predicted properties listed for these alloys. The calculated material properties for an alloy ABD-1 with a nominal composition according to Table 4 and in accordance with the present invention are also given.

Figure 2:
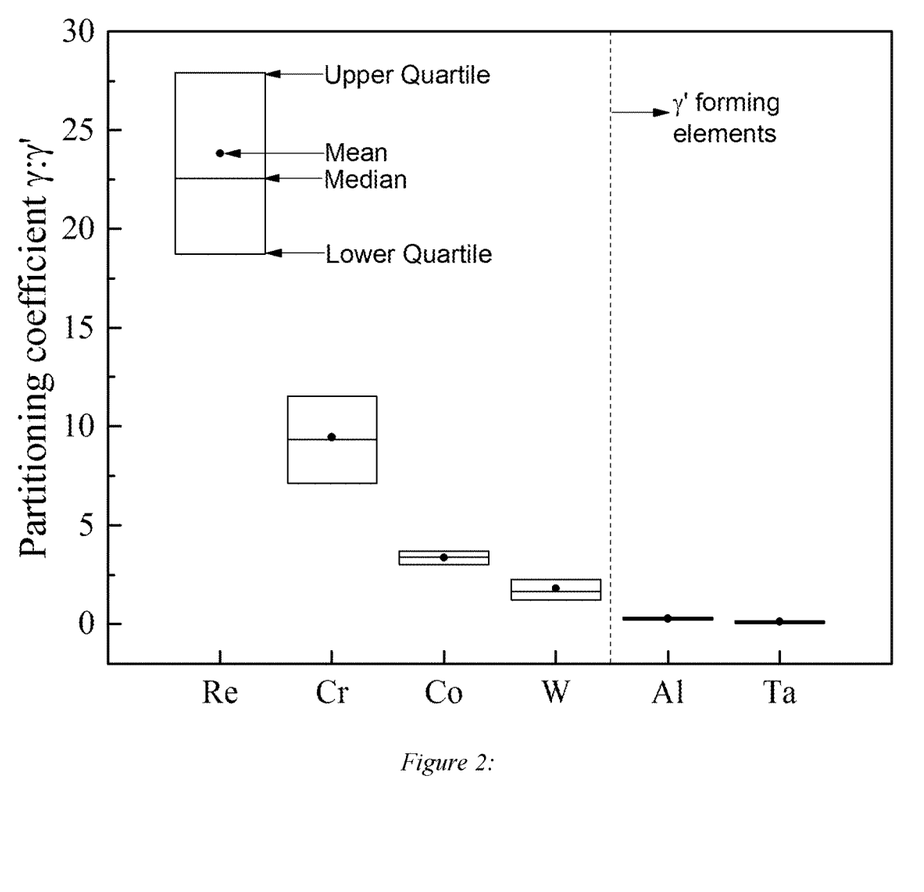
FIG. 2 shows the partitioning coefficient for the main components in the alloy design space.

The partitioning coefficient for each element included in the alloy design space was determined from phase equilibrium calculations conducted at 900° C., FIG. 2. A partitioning coefficient of unity describes an element with equal preference to partition to the γ or γ' phase. A partitioning coefficient less than unity describes an element which has a preference for the γ' phase, the closer the value to zero the stronger the preference. The greater the value above unity the more an element prefers to reside within the γ phase. The partitioning coefficient of Al and Ta shows that these are strong γ' forming elements. The elements Re, Cr, Co and W

TABLE 3

Calculated phase fractions and merit indices made with the "Alloys-by-Design" software. Results for second generation single crystal turbine blades listed in Table 1 and the nominal composition of the new alloy ABD-1 listed in Table 4.

| Alloy | Phase Fractions | | | | Creep Merit Index ($m^{-2}s \times 10^{-15}$) | Density ($g/cm^3$) | Cost ($/lb) | $\gamma_{APB(111)}$ ($mJ/m^2$) | γ/γ' Misfit (%) |
|---|---|---|---|---|---|---|---|---|---|
| | γ' | σ | μ | σ + μ | | | | | |
| CMSX-4 | 0.65 | 0.004 | 0.024 | 0.028 | 7.2 | 8.7 | 59 | 311 | 0.17 |
| PWA 1484 | 0.63 | 0.000 | 0.040 | 0.040 | 7.5 | 8.9 | 62 | 318 | 0.17 |
| Rene N5 | 0.67 | 0.003 | 0.035 | 0.038 | 6.8 | 8.7 | 60 | 286 | 0.02 |
| TMS-82+ | 0.60 | 0.000 | 0.036 | 0.036 | 7.0 | 8.9 | 51 | 299 | 0.04 |
| ABD-1 | 0.65 | 0.000 | 0.032 | 0.032 | 7.0 | 8.8 | 41 | 315 | 0.13 |

Figure 1:
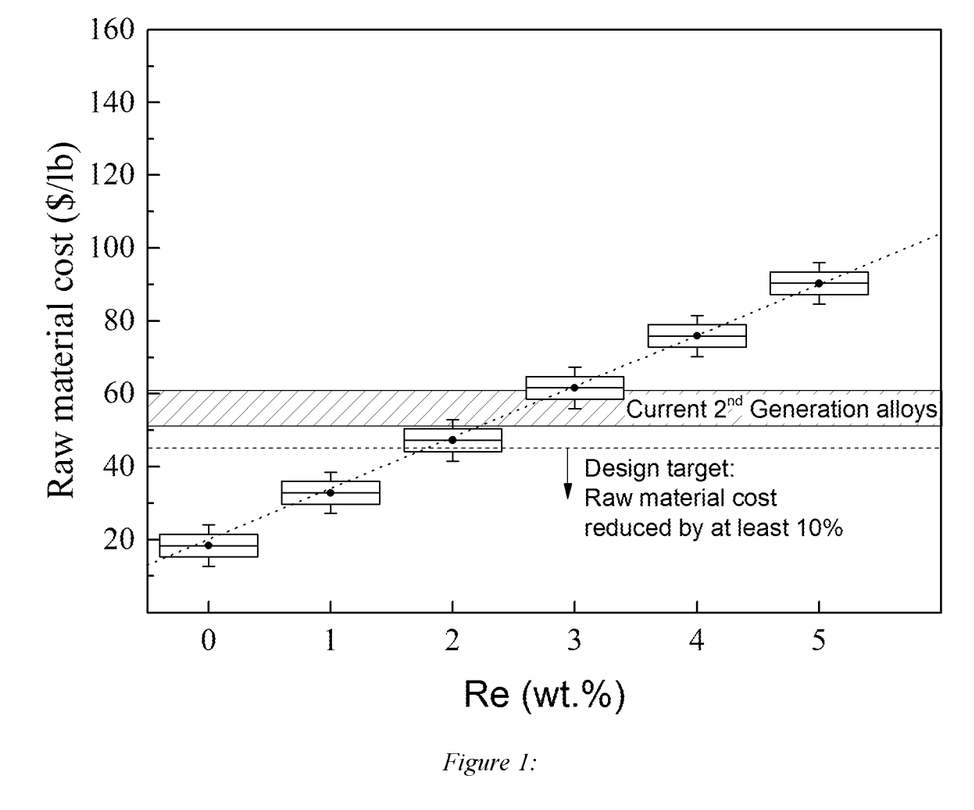
FIG. 1 shows the effect of rhenium content on raw material cost for the alloy design space considered.

The estimated cost for each composition within the alloy design space was strongly effected by Re content. FIG. 1 shows the distribution for alloy cost for each increment of Re interrogated. The design target was to reduce the cost of the new alloy by at least 10% relative to the lowest cost alloy listed in Table 3. This required that the alloy cost was below 45 $/lb according to the estimates made using the ABD model. Therefore, it was necessary to restrict Re content to 2 weight percent (wt. %) or less in order to meet the cost target for the new alloy. Reducing the Re content further, to say 1.8% or below, reduces cost even further, at the expense of creep merit index (see below).

Figure 5:
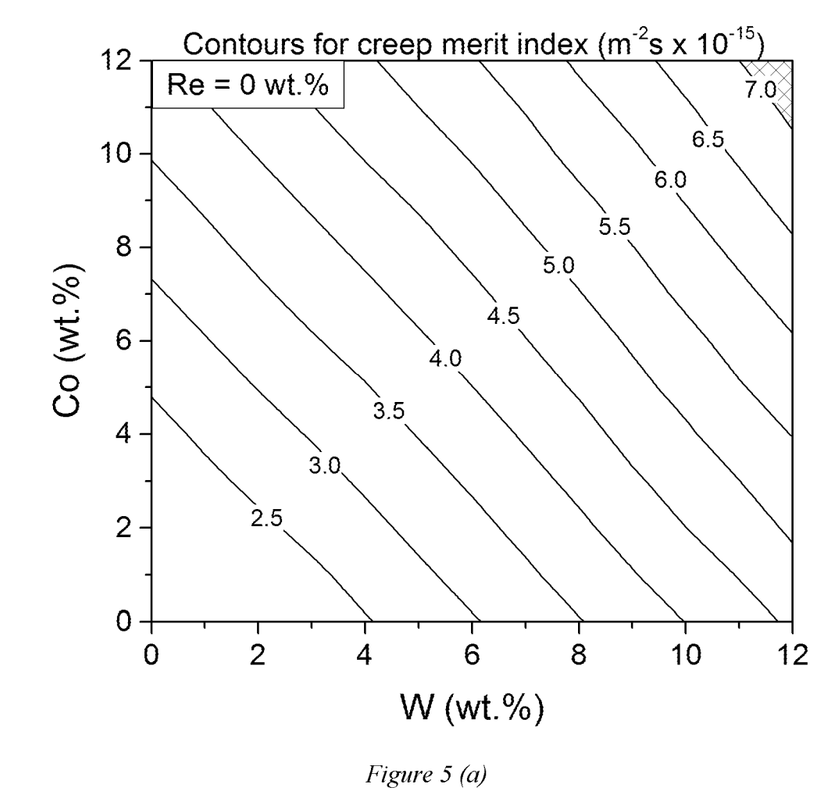
FIGS. 5a-c show the effects on creep resistance of the amounts of W and Co in alloys with a volume fraction of γ' between 60 and 70%, with an anti-phase boundary energy of greater than 310 mJ/m² which contain 0%, 1% and 2% wt. % rhenium respectively.
Figure 6:
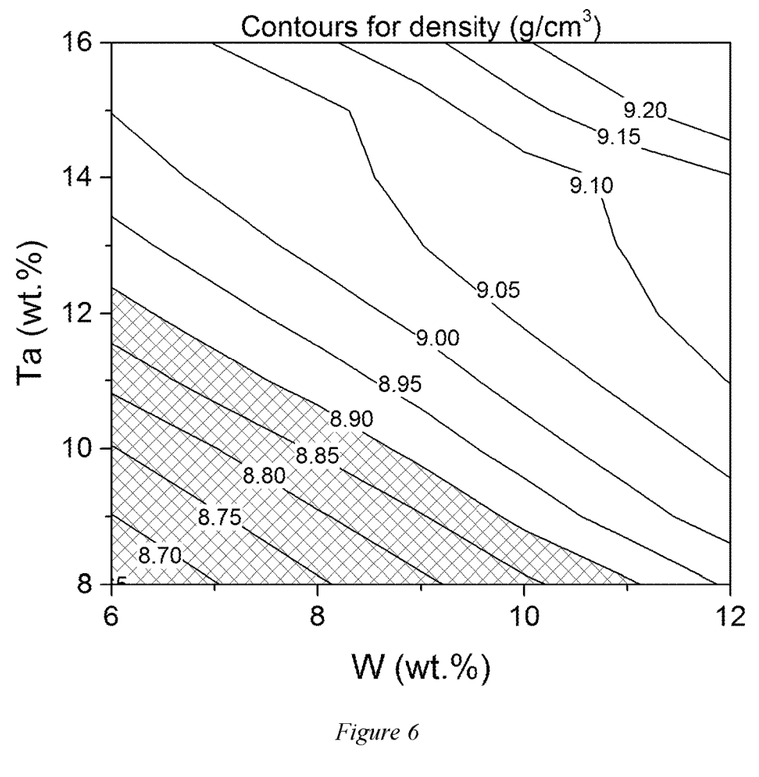
FIG. 6 is a plot showing the effects of elements of W and Ta on the density of an alloy for alloys containing between 1 and 2 weight % Re and with a volume fraction of γ' of between 60 and 70%.

For second generation single crystal turbine blades the Re content typically ranges between 2.5-3 wt. %, these additions are made to impart the necessary creep resistance. However, the ABD calculations showed surprisingly and for the first time the existence of alloy compositions containing 2 wt. % Re or less with the required creep resistance. Lower levels of Re compared to the second generation alloys of Table 1, result in the lower creep merit index (FIGS. 5(a)-(c)). As explained below, to compensate for lower Re content compared to the second generation alloys, the amount of W and/or Co is greater in the present invention than in the second generation alloys. This helps increase creep resistance due to improved creep merit index. Additionally, higher levels of Ta, which result in higher anti-phase boundary energy (FIG. 4), are also thought to compensate for lower levels of Re. As is clear from FIG. 4, higher levels of Ta are advantageous with respect to anti-phase boundary energy, but too high levels of Ta result in too high a density (FIG. 6). Higher levels of W, Co and/or Ta will in general improve creep resistance compared to alloys of otherwise the same composition.

Figure 3:
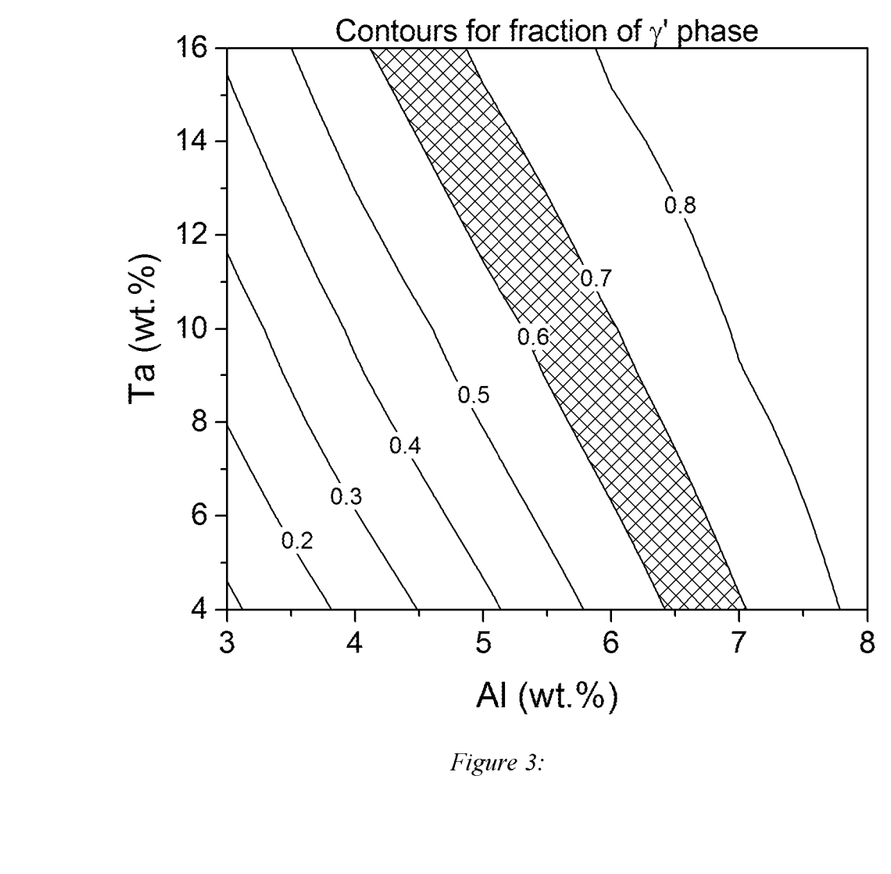
FIG. 3 is a contour plot showing the effect of γ' forming elements Al and Ta on the volume fraction of γ' for alloys containing up to 2 weight % rhenium at 900° C.

Optimisation of the alloy's microstructure—primarily comprised of an austenitic face centre cubic (FCC) gamma phase (γ) and the ordered $L1_2$ precipitate phase (γ')—was required to maximise creep resistance. A volume fraction of the γ' phase between 60-70% is required, this microstructure is known to provide the maximum level of creep resistance in single crystal blade alloys.

partition preferably to the γ phase. For the elements considered within the alloy design space, Al and Ta partition most strongly to the γ' phase, FIG. 2. Hence, Al and Ta levels were controlled to produce the desired γ' volume fraction. Alloys with lower levels of Al and/or Ta can be expected to have lower γ' volume fraction and thus lower creep resistance. The change in calculated phase equilibrium volume fraction of γ' with Al and Ta additions for alloys containing up to 2 wt. % Re at 900° C. is presented in FIG. 3. For the alloy design space studied it was found that an Al concentration range between 4-7 wt. % in order to produce the desired γ' volume fraction. However, as explained below, the maximum amount of allowable Al is lower in the present invention to allow for higher amounts of Ta, which is beneficial for greater anti-phase boundary energy.

Figure 4:
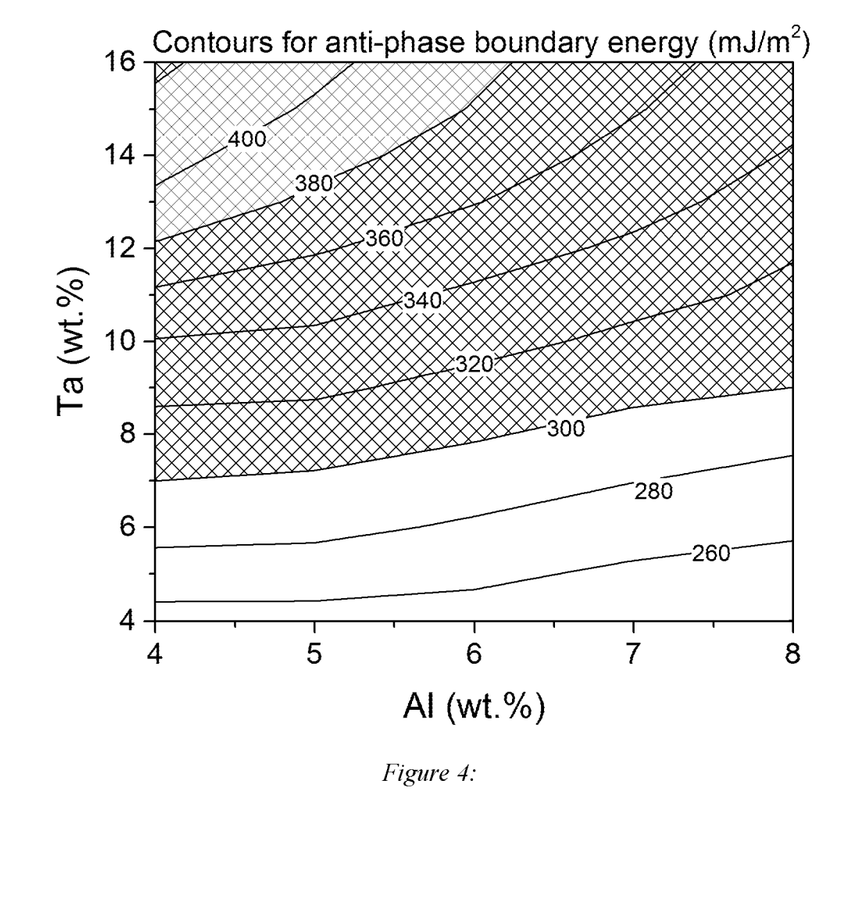
FIG. 4 is a plot showing the effect of γ' forming elements Al and Ta on anti-phase boundary energy, for alloys containing up to 2 wt. % rhenium.

Optimisation of Al and Ta levels was also required to increase the anti-phase boundary (APB) energy of the γ' phase. The APB energy is strongly dependent upon the chemistry of the γ' phase. FIG. 4 shows the influence of Al and Ta on the APB energy. It was necessary to isolate alloy compositions where the APB energy was equivalent to or greater than current second generation single crystal alloys (~310 $mJ/m^2$). Modelling calculation showed that Ta levels in the alloy greater than 8 wt. % (at Al=4-7 wt. %, meaning 60-70% volume γ') produce an alloy with an acceptably high APB energy and so high creep resistance and at the same time producing a high enough volume fraction of γ'. The minimum Ta concentration required results in Al additions being limited to a maximum of 6.5 wt. % so that the desired γ' volume fraction can be achieved, FIG. 3. Therefore, Al concentration of between 4.0 and 6.5 wt. % is desirable to achieve both the desired γ' volume fraction and an acceptably high APB energy. A minimum level of 5.5 wt. % Al is preferred as this can limit the amount of Ta necessary and so reduce density and a higher level of Al also promotes oxidation resistance by formation of an alumina oxide scale ($Al_2O_3$). The maximum Ta content will be explained below with reference to FIG. 6 and results in a preferred Ta range of 8.0-10.5 wt. %.

Niobium (Nb), Titanium (Ti), Vanadium (V) elements behave in a similar way to that of Tantalum i.e. they are gamma prime forming elements which increase anti-phase boundary energy. These elements can optionally be added to the alloy. The benefits of this may include lower cost and density in comparison to Tantalum. However, additions of these elements must be limited as they can have a negative impact on the environmental resistance of the alloy. Therefore, those elements can each be present in an amount of up to 0.5 wt. %. Preferably those elements are substituted for tantalum meaning that the sum of the elements consisting of Nb, Ti, V and Ta is preferably limited to 8.0-10.5 wt. %, more preferably 8.0-10.0 wt. % or 8.0-9.5 wt. % which are the preferred ranges for tantalum. Independently, in an embodiment, the sum of the elements consisting of Nb, Ti, V is preferably limited to below 1.0 wt. % and preferably below 0.5 wt. % so as to avoid reduction in environmental resistance of the alloy.

For the alloys which satisfied the previously described requirements it was necessary to optimise the levels of refractory elements for maximum creep resistance. The creep resistance was determined by using the creep merit index model. The influence which Re, W and Co have on creep resistance is presented in FIG. 5. It is desirable to maximise the creep merit index as this is associated with an improved creep resistance. It is seen that increasing the levels of Re, W and Co will improve creep resistance.

A creep merit index of $7.0 \times 10^{-15}$ $m^{-2}s$ or greater was necessary to produce an alloy with creep resistance comparable to current second generation single crystal alloys (see Table 2). FIG. 5a shows that if the alloy does not contain Re, there are very few alloys which have the required creep merit index. Hence, it is preferred that the alloy contains at least 1 wt. % Re, i.e. between 1-2 wt. % Re. When the Re content of the alloy is at 2 wt. %, FIG. 5c, the minimum W and Co levels required to produce an alloy with sufficient creep resistance are 6 wt. % and 4 wt. %, respectively. The level of W can be reduced to 5.5 wt. %, particularly if Mo is present as it behaves similarly to W in improving creep resistance and the sum of W and Mo is greater than 6 wt. %. However, as lower levels of Re substantially reduce the cost of the alloy, it is preferred that the minimum W and Co levels determined from FIG. 5b are used. These higher levels also beneficially result in higher creep merit index (and so creep resistance) at higher levels of Re. Thus, the preferred minimum W and Co levels are 8 wt. % and 7 wt. %, respectively. A Co level of 9.0 wt. % or more results in increased creep merit index without increasing the alloy's creep anisotropy and so is preferred. Moreover, it is preferred that the sum of the alloying elements W and Co is greater than 17 wt. %, preferably 18 wt. % in order to produce an alloy with sufficient creep resistance (calculated on the basis of the position of the 7.0 $m^{-2}s \times 10^{-15}$ contour of FIGS. 5(b) and (c)). In a preferred embodiment, the minimum Re content is 1.4 wt. %. At such higher Re content, creep merit index remains high so that creep performance is not sacrificed too much in favour of reduced cost.

Molybdenum behaves in a similar way to tungsten i.e. this slow diffusing element can improve creep resistance. However, additions of molybdenum must be controlled as it strongly increases the alloys propensity to form deleterious TCP phases. Therefore, molybdenum present in an amount up to 0.5 wt. % can be beneficial. Preferably molybdenum is substituted for tungsten where the sum of the elements consisting of tungsten and molybdenum is greater than 6 wt. %, more desirably 8 wt. %.

Modelling calculations show that cobalt increases the creep merit index. Additions of cobalt are also know to lower the stacking fault energy in the gamma matrix, this also improves creep resistance. Moreover, producing an alloy which contains 9.0 wt. % or more cobalt, preferably more than 9.2 wt. %, is beneficial for the manufacturing process. Additions of cobalt greater than this level reduce the gamma-prime solvus temperature. This increases the difference between the gamma-prime solvus and melting temperature, increasing the alloys heat-treatment window. An increased heat-treatment window is desirable as this reduces the susceptibility of the alloy to incipient melting during the high temperature solution heat-treatment. However, Co additions must be limited as high Co levels will increase the alloy's creep anisotropy, particularly in primary creep. This makes the creep rate strongly dependent upon orientation of the single crystal. An upper limit of 14 wt %, preferably 12 wt. %, more preferably 11 wt. % cobalt is necessary to control the amount creep of anisotropy to an acceptable level.

For aeroengine applications it is required that the density of the alloy is acceptably low. The second generation alloys listed in Table 1 have densities ranging between 8.7-8.9 $g/cm^3$ as shown in Table 3. The objective of the design was to limit the alloy density to 8.9 $g/cm^3$, preferably designing an alloy with a density of 8.8 $g/cm^3$ or lower. Based upon the previously described constraints it was found that Ta and W had the strongest influence upon density. To limit the density of the alloy to 8.9 $g/cm^3$ the concentration of W must be limited to 11 wt. %. However, the preferred maximum W concentration is restricted to 10.5 wt. % or to 10.0 wt. % or less or to 9.8 wt. % or less or to 9.5 wt. % or less, limiting the alloy density to less than 8.8 $g/cm^3$ for low levels of Ta. The Ta content must limited to 12 wt. % to achieve a density of less than 8.9 $g/cm^3$. It is preferable that the Ta content is limited to 10.5 wt. % so that density remains below 8.8 $g/cm^3$ at low levels of W. It is also preferable to limit the sum of W and Ta to 19 wt. %, preferably to 18 wt. %, more preferably to 17 wt. % to control alloy density (see FIG. 6 which shows the effects of W and Ta on density). The raw elemental cost of Ta is quite high, so there are cost benefits to reducing it. Also high levels of Ta may lead to the formation of the deleterious eta phase ($Ni_3Ta$) which can degrade the mechanical properties. So desirably Ta is present at 10 wt. % or less or even at 9.5 wt. % or less, whilst being present at 8 wt. % or more. Considering the preferred range for Ta additions on the basis of limiting the density of the alloy (max 10.5 wt. %) and having a high enough APB energy (min 8 wt. %), between 8-10.5 wt. %, it is preferred to have the sum of the elements Al and Ta between 13.5-16.5 wt. % in order to produce an alloy with a γ/γ' microstructure of 60 to 70% volume fraction γ'.

Figure 7:
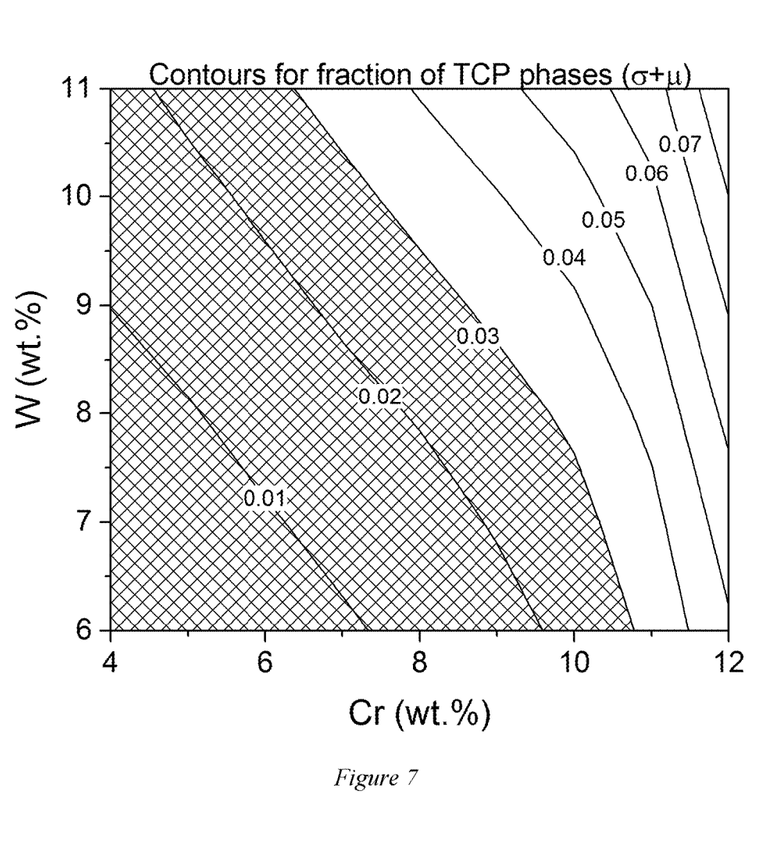
FIG. 7 is a plot showing the effect of Cr and W content on the total volume fraction of TCP phases (μ and σ) at 900° C. determined using phase equilibrium calculations for alloys containing between 1 and 2 weight % Re and with a volume fraction of γ' of between 60 and 70%.

In order to remain resistant to creep over a significant time period the addition of slow diffusing elements Re, W and Co is required. Additions of Cr are also required to promote resistance to oxidation/corrosion damage. The addition of high levels of W and Cr were found to increase the propensity to form unwanted TCP phases, primarily σ and μ phases. FIG. 7 shows the effect of Cr and W additions on the overall fraction of TCP phases (σ+μ) for alloys with a Re content is fixed between 1-2 wt. % and γ' fraction between 60-70%. From FIG. 7 it is seen that when a W content of 6 wt. % is included in the alloy the maximum allowable Cr content is 11 wt. %, limiting the fraction of TCP phases to a level comparable with the calculated properties for the alloys listed in Table 3. However, if the preferred level of W additions is used (greater than 8 wt. %) to impart sufficient creep resistance the maximum allowable Cr content is 10 wt. %, maintaining the level of TCP phases equivalent to current second generation alloys. The minimum Cr content is greater than or equal to 7 wt. % and preferably greater than or equal to 7.5 wt. % in order to attain oxidation resistance which is improved in comparison to current second generation single crystal alloys which have Cr contents ranging 5-7 wt. %. That is, a higher weight % of Cr is provided than in the second generation alloys on the basis that this will improve oxidation resistance compared to those alloys. It is preferred that the Cr content is limited to 8.5 wt. % to reduce the propensity for the alloy to form the deleterious TCP phases. So the Cr range is 7.0-11.0 wt. %, preferably 7.0 to 8.5 wt. %, more preferably 7.5-8.5 wt. %, most preferably above 7.5 wt. % and/or below 8.5 wt. %.

Limiting the level of Ta to control density and correspondingly increasing the level of Cr (limiting TCP phase formation) but increasing oxidation resistance may be beneficial.

To control microstructural stability, maintaining the level of TCP phases equivalent to or less than current second generation alloys it is beneficial to limit the sum of elements W, Cr and Re to less than 19 wt. %, preferably less than 18 wt. %.

It is beneficial that when the alloy is produced, it is substantially free from incidental impurities. These impurities may include the elements carbon (C), boron (B), sulphur (S), zirconium (Zr) and manganese (Mn). If concentrations of C remain at 100 PPM or below (in terms of mass) the formation of unwanted carbide phases will not occur. B content is desirably limited to 50 PPM or less (in terms of mass) so that formation of unwanted boride phases will not occur. Carbide and boride phases tie up elements such as tungsten or tantalum which are added to provide strength to the gamma and gamma-prime phases. Hence, mechanical properties including creep resistance are reduced if carbon and boron are present in greater amounts. The elements S and Zr preferably remain below 30 and 500 PPM (in terms of mass), respectively. Manganese (Mn) is an incidental impurity which is preferably limited to 0.05 wt % (500 PPM in terms of mass). The presence of Sulphur (S) above 0.003 wt. % can lead to embrittlement of the alloy and sulphur also segregates to alloy/oxide interfaces formed during oxidation. This segregation may lead to increased spallation of protective oxide scales. The levels of Zr and Mn must be controlled as these may create casting defects during the casting process, for example freckling. If the concentrations of these incidental impurities exceed the specified levels, issues surround product yield and deterioration of the material properties of the alloy is expected.

Additions of Hafnium of up to 0.5 wt. %, or more preferably up to 0.2 wt. % are beneficial for tying up incidental impurities in the alloy, in particular carbon. Hafnium is a strong carbide former, so addition of this element is beneficial as it will tie up any residual carbon impurities which may be in the alloy. It can also provide additional grain boundary strengthening, which is beneficial when low angle boundaries are introduced in the alloy.

Additions of the so called 'reactive-elements', Silicon (Si), Yttrium (Y), Lanthanum (La) and Cerium (Ce) may be beneficial up to levels of 0.1 wt. % to improve the adhesion of protective oxide layers, such as $Al_2O_3$. These reactive elements can 'mop-up' tramp elements, for example sulphur, which segregates to the alloy oxide interface weakening the bond between oxide and substrate leading to oxide spallation. In particular, it has been shown that additions of silicon to nickel based superalloys at levels up to 0.1 wt. % are beneficial for oxidation properties. In particular silicon segregates to the alloy/oxide interface and improves cohesion of the oxide to the substrate. This reduces spallation of the oxide, hence, improving oxidation resistance.

Based upon the description of the invention presented in this section, broad and preferred ranges for each elemental addition were defined, these ranges are listed Table 3. An example composition—alloy ABD-1—was selected from the preferred compositional range, the composition of this alloy is defined in Table 3. Alloy ABD-1 was found to be amenable to standard methods used for the production of single crystal turbine blade components. This production method involves: preparation of an alloy with the composition of ABD-1, preparation of a mould for casting the alloy using investment casting methods, casting the alloy using directional solidification techniques where a 'grain selector' is used to produce a single crystal alloy, subsequent multi-step heat treatment of the single crystal casting.

TABLE 3

Compositional range in wt. % for the newly design alloy.

|  |  | Cr | Co | Re | W | Al | Ta |
|---|---|---|---|---|---|---|---|
| Broad | Min | 7.0 | 4.0 | 1.0 | 6.0 | 4.0 | 8.0 |
|  | Max | 11.0 | 14.0 | 2.0 | 11.0 | 6.5 | 12.0 |
| Preferred | Min | 7.0 | 9.0 | 1.4 | 8.0 | 5.5 | 8.0 |
|  | Max | 8.5 | 11.0 | 1.8 | 9.5 | 6.5 | 10.5 |
| Nominal | ABD-1 | 8.0 | 10.0 | 1.6 | 8.5 | 5.8 | 8.5 |

Experiment testing of alloy ABD-1 was used to validate the key material properties claimed within this patent, mainly sufficient creep resistance and improved oxidation behaviour in comparison to that of a current second generation turbine blade. The behaviour of alloy ABD-1 was compared with alloy CMSX-4, which was tested under the same experimental conditions.

Single crystal castings of alloy ABD-1 of nominal composition according to Table 4 were manufactured using conventional methods for producing single crystal components. The castings were in the form of cylindrical bars of 10 mm diameter and 160 mm in length. The cast bars were confirmed to be single crystals with an orientation within 10° from the <001> direction.

The as cast material was given a series of subsequent heat treatments in order to produce the required γ/γ' microstructure. A solution heat treatment was conducted at 1305° C. for 6 hours, this was found to remove residual microsegregation and eutectic mixtures. The heat treatment window for the alloy was found to be sufficient to avoid incipient melting during the solution heat treatment. Following the solution heat treatment the alloy was given a two stage ageing heat treatment, the first stage conducted at 1120° C. for 3 hours and the second stage conducted at 870° C. for 16 hours.

Creep specimens of 20 mm gauge length and 4 mm diameter were machined from fully heat-treated single crystal bars. The orientation of the test specimens were within 10° from the <001> direction. Test temperatures ranging from 800 to 1100° C. were used to evaluate the creep performance of the ABD-1 alloy. Cyclic oxidation tests were performed on the fully heat treated material. Cyclic oxidation tests were carried out at 1000° C. using 2 hours cycles over a time period of 50 hours.

Figure 8:
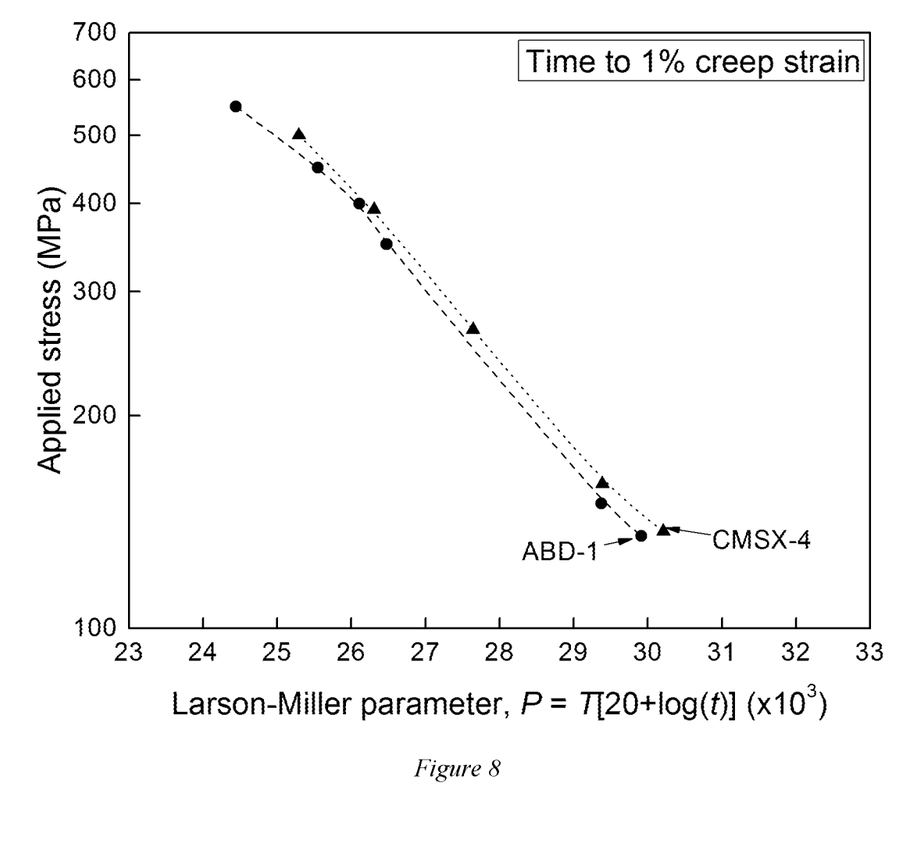
FIG. 8 shows the time to 1% creep strain for alloy ABD-1 of the present invention (circles) compared with the second generation single crystal turbine blade alloy CMSX-4 (triangles)
Figure 9:
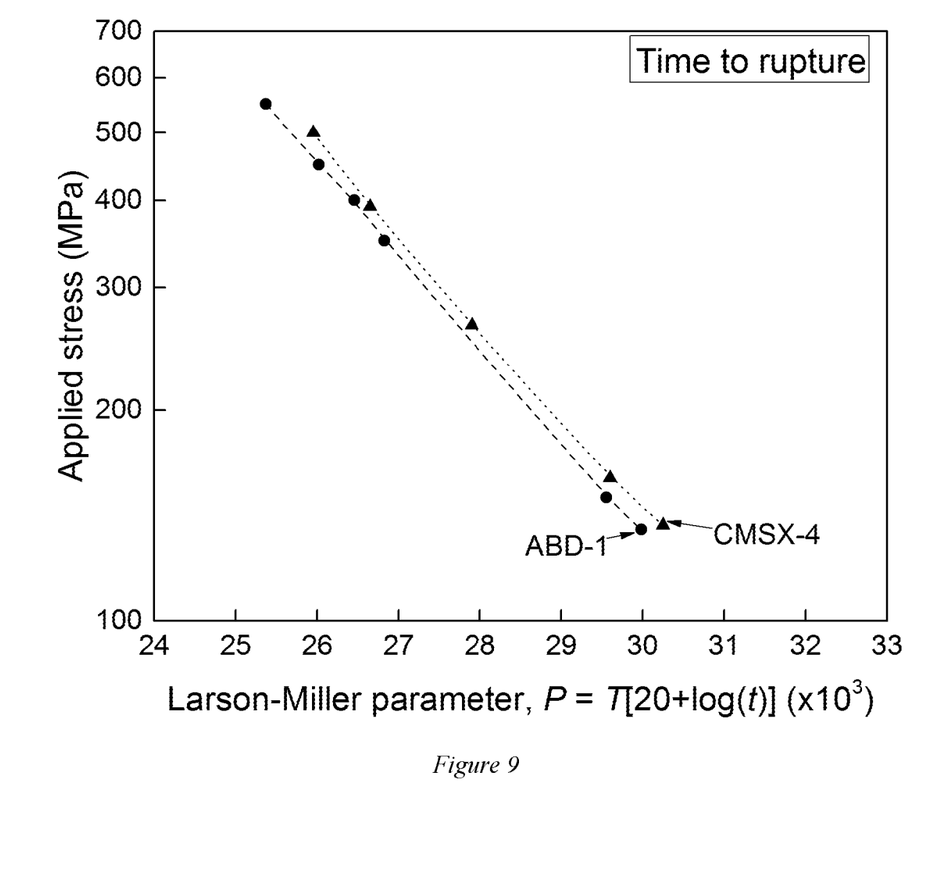
FIG. 9 shows the time to rupture for alloy ABD-1 of the present invention (circles) compared with CMSX-4 (triangles)

A Larson-Miller diagram was used to compare the creep resistance of alloy ABD-1 with alloy CMSX-4. In FIG. 8 a comparison of time to 1% creep strain is presented for both alloys. The time to 1% strain is critical as most gas turbine components are manufactured to tight tolerances to achieve maximum engine performance. After low levels of strain—in the order of a few percent—components will often be replaced. It is seen that alloy ABD-1 is comparable to CMSX-4 in time to 1% creep strain. FIG. 9 shows a comparison of time to creep rupture for both alloys, it is seen that alloy ABD-1 has a rupture life comparable to that of CMSX-4.

Figure 10:
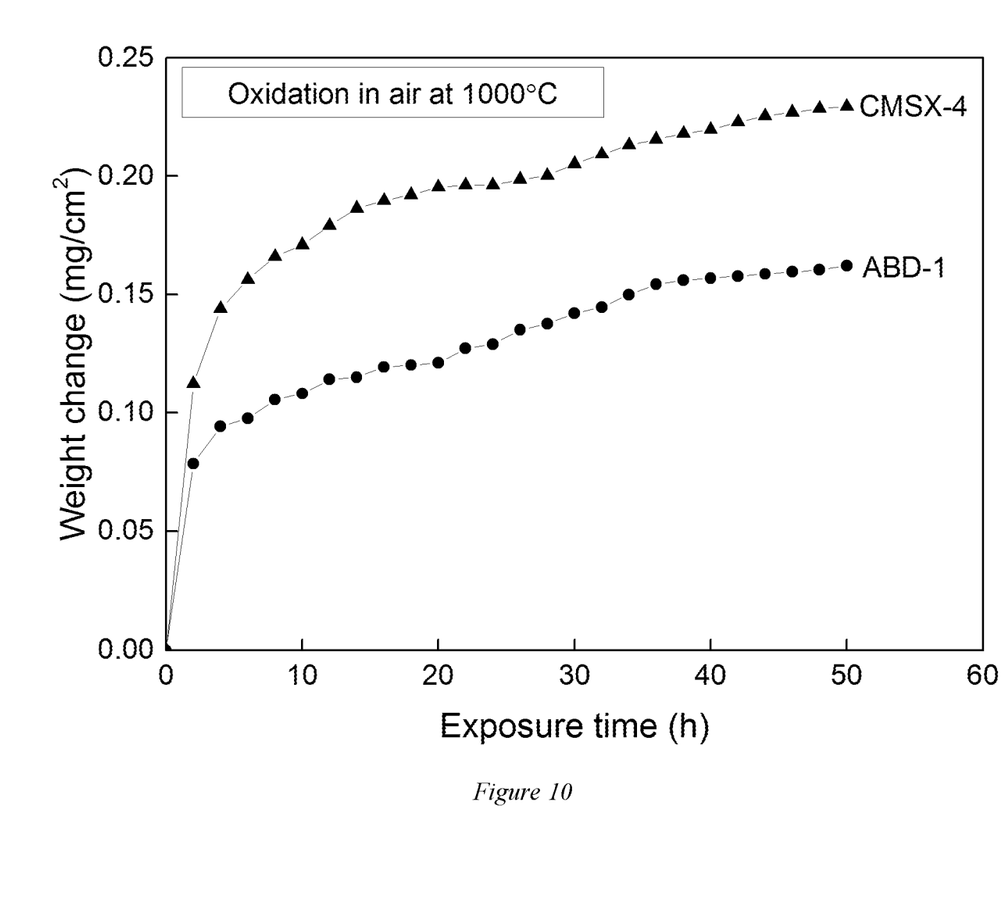
FIG. 10 is a plot of measured weight change for CMSX-4 (circles) and alloy ABD-1 of the present invention (squares) when oxidised in air at 1000° C.

The oxidation behaviour of alloys ABD-1 and CMSX-4 was also compared. As turbine temperatures continue to rise—improving thermal efficiency of the engine—component failure due to corrosion damage such as oxidation is becoming more prevalent. Hence, significant gains in component life may be attained by improving oxidation resistance. The alloy ABD-1 was designed such that it would have improved oxidation behaviour relative to current second generation alloys. Cyclic oxidation results for ABD-1 and CMSX-4 are presented in FIG. 10. A reduction in mass gain with respect to time is evidence of improved oxidation behaviour as the formation of a protective oxide scale has occurred limiting the ingress of oxygen into the substrate material. The ABD-1 alloy shows significantly reduced weight gain with respect to time when compared to CMSX-4, indicative of improved oxidation performance.

Overall the alloy ABD-1 shows equivalent or improved behaviour in comparison to CMSX-4. This has been achieved using an alloy with a significantly reduced cost in comparison to CMSX-4. The cost of alloy ABD-1 is calculated to be 30% lower than that of CMSX-4.

The invention claimed is:

1. A nickel-based alloy composition consisting, in weight percent, of: between 7.0 and 11.0% chromium, between 4.0 and 14.0% cobalt, between 1.0 and 2.0% rhenium, between 5.5 and 11.0% tungsten, between 0.0 and 0.5% molybdenum, between 4.0 and 6.5% aluminium, between 8.0 and 12.0% tantalum, between 0.0 and up to 0.5% hafnium, between 0.0 and 0.5% niobium, between 0.0 and 0.5% titanium, between 0.0 and 0.5% vanadium, between 0.0 and 0.1% silicon, between 0.0 and 0.1% yttrium, between 0.0 and 0.1% lanthanum, between 0.0 and 0.1% cerium, between 0.0 and 0.003% sulphur, between 0.0 and 0.05% manganese, between 0.0 and 0.05% zirconium, between 0.0 and 0.005% boron, between 0.0 and 0.01% carbon, the balance being nickel and incidental impurities.

2. The nickel-based alloy composition according to claim 1, consisting, in weight percent, of between 7.0 and 8.5% chromium.

3. The nickel-based alloy composition according to claim 1 consisting, in weight percent, of between 4.0 and 12.0% cobalt.

4. The nickel-based alloy composition according to claim 1, consisting, in weight percent, of between 1.4 and 1.8% rhenium.

5. The nickel-based alloy composition according to claim 1, consisting, in weight percent of, between 6.0 and 11.0% tungsten.

6. The nickel-based alloy composition according to claim 1, consisting, in weight percent, of between 5.5 and 6.5% aluminium.

7. The nickel-based alloy composition according to claim 1, consisting, in weight percent, of between 8.0 and 10.5% tantalum.

8. The nickel-based alloy composition according to claim 1, consisting, in weight percent, of between 0.0 and 0.2% hafnium.

9. The nickel-based alloy composition according to claim 1, consisting, in weight percent, of more than 9.0% cobalt.

10. The nickel-based alloy composition according to claim 1, consisting, in weight percent, of less than 10.0% tungsten.

11. The nickel-based alloy composition according to claim 1, wherein the sum of the elements cobalt and tungsten, in weight percent, is greater than 17%.

12. The nickel-based alloy composition according to claim 1, wherein the sum of the elements tungsten and tantalum, in weight percent, is less than 19%.

13. The nickel-based alloy composition according to claim 1, wherein the sum of the elements aluminium and tantalum, in weight percent, is between 13.5 and 16.5%.

14. The nickel-based alloy composition according to claim 1, wherein the sum of the elements rhenium, chromium and tungsten, in weight percent, is less than 19%.

15. The nickel-based alloy composition according to claim 1, wherein the sum of the elements niobium, titanium and vanadium, in weight percent, is less than 1%.

16. The nickel-based alloy composition according to claim 1, wherein the sum of the elements molybdenum and tungsten is at least 6 wt. %.

17. The nickel-based alloy according to claim 1, wherein the sum of the elements niobium, titanium, vanadium and tantalum, in weight percent, is between 8.0 and 10.5 wt. %.

18. A single crystal article formed of the nickel-based alloy composition of claim 1.

19. A turbine blade for a gas turbine engine formed of an alloy according to claim 1.

20. A gas turbine engine comprising the turbine blade of claim 19.

* * * * *